US009285092B2

United States Patent
Anzai et al.

(10) Patent No.: US 9,285,092 B2
(45) Date of Patent: Mar. 15, 2016

(54) PROJECTOR TYPE HEADLIGHT

(71) Applicants: Stanley Electric Co., Ltd., Tokyo (JP); NALUX CO., LTD., Osaka (JP)

(72) Inventors: Toshimichi Anzai, Tokyo (JP); Yoshiaki Nakaya, Tokyo (JP); Norihisa Sakagami, Osaka (JP)

(73) Assignees: Stanley Electric Co., Ltd., Tokyo (JP); NALUX CO., LTD., Osaka (JP)

( * ) Notice: Subject to any disclaimer, the term of this patent is extended or adjusted under 35 U.S.C. 154(b) by 257 days.

(21) Appl. No.: 13/949,722

(22) Filed: Jul. 24, 2013

(65) Prior Publication Data

US 2014/0029287 A1 Jan. 30, 2014

(30) Foreign Application Priority Data

Jul. 24, 2012 (JP) ................. 2012-163970

(51) Int. Cl.
*F21S 8/10* (2006.01)
*G02B 27/00* (2006.01)
*G02B 19/00* (2006.01)

(52) U.S. Cl.
CPC ......... *F21S 48/1283* (2013.01); *F21S 48/1154* (2013.01); *F21S 48/1258* (2013.01); *F21S 48/1747* (2013.01); *G02B 19/0047* (2013.01); *G02B 27/0037* (2013.01)

(58) Field of Classification Search
CPC .......................... F21S 48/1154; F21S 48/1283
See application file for complete search history.

(56) References Cited

U.S. PATENT DOCUMENTS

| 2004/0160772 | A1* | 8/2004 | Tatsukawa et al. ........... 362/244 |
| 2005/0122735 | A1* | 6/2005 | Watanabe et al. ............ 362/539 |
| 2008/0180804 | A1* | 7/2008 | Suzuki .......................... 359/649 |
| 2008/0285297 | A1* | 11/2008 | Ishida ........................... 362/539 |
| 2009/0310377 | A1  | 12/2009 | Kanai |
| 2010/0172146 | A1* | 7/2010 | Fischer ........................ 362/520 |
| 2012/0163009 | A1* | 6/2012 | Nakazato et al. ............ 362/510 |

FOREIGN PATENT DOCUMENTS

JP    2008-226542    *    9/2008
WO    2009/028686 A1    3/2009

* cited by examiner

*Primary Examiner* — Elmito Breval
(74) *Attorney, Agent, or Firm* — Kenealy Vaidya LLP

(57) ABSTRACT

A projector type headlight can include a projection lens arranged on an optical axis extending in a longitudinal direction of a vehicle, and a light source unit arranged on a more rear side than a back side focal plane of the projection lens, the projection lens including resin lenses which are arranged on the optical axis. A resin lens out of the resin lenses arranged closer to the light source unit includes a diffraction grating provided on a lens face in a side opposite to a light source, the resin lens out of the resin lenses arranged closer to the light source unit has a lens face having a positive power, which is arranged in a light source side, and the diffraction grating is designed so as to cancel chromatic aberration of light emitted from the light source unit and emitted forward through the resin lenses.

13 Claims, 8 Drawing Sheets

PROJECTOR TYPE HEADLIGHT

This application claims the priority benefit under 35 U.S.C. §119 of Japanese Patent Application No. 2012-163970 filed on Jul. 24, 2012, which is hereby incorporated in its entirety by reference.

BACKGROUND

1. Field

The presently disclosed subject matter relates to a projector type headlight, and particularly relates to a projector type headlight using a resin lens which can keep a grating shape and improve color bleeding in the vicinity of a boundary line between light and shade in a predetermined light distribution pattern, even when the diameter has been enlarged (to φ 60 mm or more, for instance).

2. Description of the Related Art

Conventionally, it has been known that in a headlight for vehicles (a so-called head lamp) that is configured so as to form a predetermined light distribution pattern including the boundary line between light and shade (referred to as a cutoff line as well) by the light which is emitted forward through a projection lens, like a projector type headlight or a direct projection type (direct type) headlight, color bleeding (referred to as color breakup as well) which originates in a chromatic aberration of the projection lens occurs in the vicinity of the boundary line between light and shade. In particular, in the case of a projection lens made from resin, the dispersion is large as compared to dispersion from a projection lens made from glass, and accordingly remarkable color bleeding which originates in the chromatic aberration can occur.

In order to improve this color bleeding, conventionally, it has been proposed to provide a diffraction grating (blaze type of diffraction grating) which is designed so as to cancel chromatic aberration, in the projection lens (see International Publication No. WO 2009/028686, for instance).

The dispersion characteristics of a dioptrics element (general projection lens which is used for projector type headlight, for instance) are opposite to those of a diffractive optical element (diffraction grating, for instance). Specifically, the dioptrics element has such characteristics that light of short wavelength (light of wavelength of bluish color) is well refracted and light of long wavelength (light of wavelength of reddish color) is not refracted, but the diffractive optical element has such characteristics on the contrary such that light of long wavelength (light of wavelength of reddish color) is well refracted and light of short wavelength (light of wavelength of bluish color) is not refracted. In addition, the diffractive optical element also has such characteristics such that when a grating period is changed, a direction of diffraction changes, and such that the smaller the grating period is, the larger the amount of diffraction (angle of diffraction) is.

Based on the above described characteristics, a grating shape of the diffraction grating is appropriately designed by using known techniques such as a phase difference function. Thereby, the chromatic aberration of light which is emitted forward through the projection lens can be cancelled, and color bleeding can be reduced which occurs in the vicinity of the boundary line between light and shade in the predetermined light distribution pattern.

Incidentally, in order to improve luminosity (highest luminous-intensity value) in the case of the projector type headlight or the direct projection type headlight, it is effective to enlarge a diameter of the projection lens. Conventionally, a projection lens used for the projector type headlight or the direct projection type headlight has been manufactured from a glass material, but in this case, the weight of the projection lens increases along with the enlargement of the diameter of the lens.

In recent years, in a headlight for vehicles, which uses a semiconductor light emitting element as a light source, there is a tendency to mold the projection lens from resin for the purpose of weight saving, because the temperature of the light source is lowered as compared to the case where a tungsten halogen lamp or a HID electric bulb is used as a light source, and it is also considered to mold the projection lens from resin which is described in the above described International Publication No. WO 2009/028686.

SUMMARY

However, the projection lens described in the above described International Publication No. WO 2009/028686 is structured from one lens, and accordingly when the lens is molded from resin, the following problems can occur.

Specifically, the projection lens described in International Publication No. WO 2009/028686 is structured from one lens, and accordingly when this lens is formed as one resin lens having a large diameter (φ 60 mm or more, for instance) by injection molding, difference in wall thickness (e.g., differences in wall thickness between a central part of a lens and a periphery of a lens in an optical axis direction) increases, which can cause problems of sink and deformation at the time of molding and aggravating molding accuracy. As a result, it becomes difficult to keep the grating shape of the diffraction grating and to improve the color bleeding in the vicinity of the boundary line between light and shade in the predetermined light distribution pattern.

The presently disclosed subject matter is designed with respect to such circumstances, and to provide a projector type headlight which uses a resin lens that can keep a grating shape and can improve color bleeding in the vicinity of a boundary line between light and shade in a predetermined light distribution pattern even when a diameter has been enlarged (to φ 60 mm or more, for instance).

In order to solve or address the above described problems, the subject matter described in the first aspect provides a projector type headlight which can include: a projection lens which is arranged on an optical axis that extends in a longitudinal direction of a vehicle; and a light source unit which is arranged further to a rear side than a back side focal plane of the projection lens, wherein the projection lens includes two resin lenses which are arranged on the optical axis, and the light source unit is configured so as to form a light source image that emits forward through the two resin lenses and forms a light distribution pattern including a boundary line between light and shade, substantially on (i.e., at, on, or in the vicinity of) the back side focal plane of the projection lens, wherein a resin lens out of the two resin lenses which is arranged closer to the light source unit has a diffraction grating provided on a lens face in a side opposite to a light source, and the resin lens out of the two resin lenses which is arranged closer to the light source unit has a lens face having a positive power, which is arranged in a light source side, wherein the diffraction grating is designed so as to cancel chromatic aberration of the light which is emitted from the light source unit and emits forward through the two resin lenses.

According to the subject matter described in the first aspect, the projection lens can include two resin lenses. Thereby, the structure can have the following advantages. Firstly, the structure can reduce a difference in wall thickness (e.g., differences in wall thickness between a central part of a lens and a periphery of a lens in an optical axis direction) of each resin lens, as compared to the case where the projection lens is structured from one resin lens. Because of this, the structure can suppress the aggravation of molding accuracy, which originates in sink and deformation of each resin lens at the time of molding, as compared to the case where the projection lens is structured from one resin lens. As a result, the structure enables a grating shape of the diffraction grating to be kept even when diameters of the projection lens (two resin lenses) are enlarged (to ϕ 60 mm or more, for instance), and thereby enables the improvement of the color bleeding which is formed in the vicinity of the boundary line between light and shade in the predetermined light distribution pattern, as compared to the case where the projection lens is structured from one resin lens. Secondly, the structure can decrease the wall thickness of each resin lens, and thereby can shorten a molding period of time, as compared to the case where the projection lens is structured from one resin lens. Thirdly, the structure can enlarge the diameter of the projection lens, and thereby can enhance luminous intensity and light quantity, as compared to the case where the projection lens is structured from one resin lens. Furthermore, each resin lens is formed from a transparent resin, and accordingly there is also such an advantage as to be capable of achieving weight saving of the projector type headlight, as compared to the case where each lens is formed from a glass material.

In addition, according to the subject matter described in the first aspect, the diffraction grating is provided on a lens face in the side opposite to the light source, in the resin lens out of the two resin lenses which is arranged closer to the light source unit. One advantage of providing the diffraction grating in the lens face in the side opposite to the light source on the resin lens that is arranged closer to the light source unit is as follows. Specifically, when the diffraction grating is provided in a lens face in the side opposite to the light source on the resin lens which is arranged closer to the light source unit, incident light on an edge portion of the diffraction grating decreases as compared to the case where the diffraction grating is provided on a lens face in a light source side, and accordingly a direction of the beam of the light which is incident on the diffraction grating can be controlled toward a direction in which diffraction loss is little (stray light is little), and the occurrence of the diffraction loss (stray light) can be reduced.

The subject matter described in the second aspect is a projector type headlight which can include: a projection lens which is arranged on an optical axis that extends in a longitudinal direction of a vehicle; and a light source unit which is arranged further to a rear side than a back side focal plane of the projection lens, wherein the projection lens includes three resin lenses which are arranged on the optical axis, and the light source unit is configured so as to form a light source image that emits forward through the three resin lenses and forms a light distribution pattern including a boundary line between light and shade, substantially on (i.e., on, at, or in the vicinity of) the back side focal plane of the projection lens, wherein a first resin lens which is arranged most distant from the light source unit and a third resin lens which is arranged closest to the light source unit out of the three resin lenses each have positive power, and a second resin lens out of the three resin lenses which is arranged between the first resin lens and the third resin lens has a diffraction grating provided on a lens face in a side opposite to the light source, wherein the diffraction grating is designed so as to cancel chromatic aberration of the light which is emitted from the light source unit and emits forward through the three resin lenses.

According to the subject matter described in the second aspect, the projection lens can include three resin lenses. Thereby, the structure can have the following advantages. Firstly, the structure can reduce a difference in wall thickness (e.g., differences in wall thickness between a central part of a lens and a periphery of a lens in an optical axis direction) of each resin lens, as compared to the case where the projection lens is structured from one resin lens. Because of this, the structure can suppress the aggravation of molding accuracy, which originates in sink and deformation of each resin lens at the time of molding, as compared to the case where the projection lens is structured from one resin lens. As a result, the structure enables a grating shape of the diffraction grating to be kept even when diameters of the projection lenses (three resin lenses) are enlarged (to ϕ 60 mm or more, for instance), and thereby enables the improvement of the color bleeding which is formed in the vicinity of the boundary line between light and shade in the predetermined light distribution pattern, as compared to the case where the projection lens is structured from one resin lens. Secondly, the structure can decrease the wall thickness of each resin lens, and thereby can shorten a molding period of time, as compared to the case where the projection lens is structured from one resin lens. Thirdly, the structure can enlarge the diameter of the projection lens, and thereby can enhance luminous intensity and light quantity, as compared to the case where the projection lens is structured from one resin lens. Furthermore, each resin lens is formed from a transparent resin, and accordingly there is also such an advantage as to be capable of achieving weight saving of the projector type headlight, as compared to the case where each lens is formed from a glass material.

In addition, according to the subject matter described in the second aspect, the diffraction grating is provided on the lens face in or on the side opposite to the light source, in the second resin lens out of three resin lenses which is arranged between the first resin lens and the third resin lens. One advantage of providing the diffraction grating on a lens face in or on the side opposite to the light source on the second resin lens is as follows. Specifically, when the diffraction grating is provided on the lens face in or on the side opposite to the light source on the second resin lens, incident light on an edge portion of the diffraction grating decreases as compared to the case where the diffraction grating is provided on a lens face in or on a light source side, and accordingly a direction of the beam of the light which is incident on the diffraction grating can be controlled toward a direction in which diffraction loss is little (stray light is little), and the occurrence of the diffraction loss (stray light) can be reduced.

In the subject matter described in the third aspect, the resin lens out of the two resin lenses which is arranged closer to the light source unit is formed so as to have a wall thickness thinner than the resin lens which is arranged farther from the light source unit, in the subject matter described in the first aspect.

According to the subject matter described in the third aspect, a diffraction grating can be provided on the resin lens out of the two resin lenses, which has a thinner wall thickness. One advantage of providing the diffraction grating in the resin lens having a thinner wall thickness is as follows. Specifically, the resin lens having the thinner wall thickness can suppress the aggravation of molding accuracy, which originates in sink and deformation at the time of molding, as compared to a resin lens having a thicker wall thickness. Accordingly, by being provided on the resin lens having the thinner wall thickness, the diffraction grating can keep the grating shape, and can improve the color bleeding which is formed in the vicinity of the boundary line between light and shade in the predetermined light distribution pattern, even when the diameters of the projection lenses (two resin lenses) are enlarged (to ϕ 60 mm or more, for instance).

In the subject matter described in the fourth aspect, the second resin lens can be formed so as to have a wall thickness thinner than the first resin lens and the third resin lens, in the subject matter described in the second aspect.

According to the subject matter described in the fourth aspect, a diffraction grating can be provided on the second resin lens out of three resin lenses, which has a wall thickness thinner than the first resin lens and the third resin lens. One advantage of providing the diffraction grating in the second resin lens having the thinner wall thickness is as follows. Specifically, the second resin lens having the thinner wall thickness can suppress the aggravation of molding accuracy, which originates in sink and deformation at the time of molding, as compared to the first resin lens and the third resin lens having a thicker wall thickness. Accordingly, by being provided on the second resin lens having the thinner wall thickness, the diffraction grating can keep the grating shape, and can improve the color bleeding which is formed in the vicinity of the boundary line between light and shade in the predetermined light distribution pattern, even when the diameters of the projection lenses (three resin lenses) are enlarged (to ϕ 60 mm or more, for instance).

In the subject matter described in the fifth aspect, the lens face in or on the side opposite to the light source on the resin lens out of two resin lenses which is arranged closer to the light source unit can be formed to be a face in which a change of the shape of the lens face is smaller than that of the lens face in the side opposite to the light source on the resin lens that is arranged distant from the light source unit, and the diffraction grating is provided on the lens face in the side opposite to the light source on the resin lens that is arranged closer to the light source unit, in the subject matter described in the first aspect or the third aspect.

According to the subject matter described in the fifth aspect, the diffraction grating can be provided on the lens face in the side opposite to the light source on the resin lens that is arranged closer to the light source unit (face in which change of shape of lens face is smaller than that of lens face in or on a side opposite to light source on resin lens that is arranged distant from light source unit). An advantage of forming the lens face on which the diffraction grating is provided to be the face in which a change of the shape of the lens face is small is as follows. Specifically, in the resin lens which has used the diffraction grating, efficiency loss (diffraction loss) occurs and the diffracted light of other orders of diffraction other than the designed order of the diffraction is generated, by the deterioration of working accuracy, which originates in tooling R that is formed when a diffraction shape (blaze) is worked and a working loss due to a damage of a working tool such as a diamond byte, and by the deterioration of transfer accuracy in molding, and the quantity of stray light (flare and glare) increases. This problem is reduced by a process of forming the lens face on which the diffraction grating is provided, so as to be the face in which a change of the shape of the lens face is smaller than that of the lens face in the side opposite to the light source on the resin lens that is arranged distant from the light source unit.

In the subject matter described in the sixth aspect, the lens face in or on the side opposite to the light source on the resin lens which is arranged closer to the light source unit can be formed into a lens face that is perpendicular to the optical axis and has a planar shape, in the subject matter described in the fifth aspect.

According to the subject matter described in the sixth aspect, the diffraction grating can be provided on the lens face having a planar shape perpendicular to the optical axis (plane or face which has little change of shape and small tangent angle and is close to plane). An advantage of forming the lens face on which the diffraction grating is provided to be a face having the planar shape is as follows. Specifically, in the resin lens which has used the diffraction grating, efficiency loss (diffraction loss) occurs and the diffracted light of other orders of diffraction other than the designed order of the diffraction is generated, by the deterioration of working accuracy, which originates in tooling R that is formed when a diffraction shape (blaze) is worked and a working loss due to a damage of a working tool such as a diamond byte, and by the deterioration of transfer accuracy in molding, and the quantity of stray light (flare and glare) increases. This problem can be reduced by a process of forming the lens face on which the diffraction grating is provided, so as to be a planar shape perpendicular to an optical axis (plane or face which has little change of shape and small tangent angle and is close to plane).

In the subject matter described in the seventh aspect, the lens face in or on the side opposite to the light source on the second resin lens can be formed into a lens face that is perpendicular to the optical axis and has a planar shape, and the diffraction grating is provided on the lens face having the planar shape, in the subject matter described in the second aspect or the fourth aspect.

According to the subject matter described in the seventh aspect, the diffraction grating can be provided on the lens face that is perpendicular to the optical axis and has the planar shape (plane or face which has little change of shape and small tangent angle and is close to plane). An advantage of forming the lens face on which the diffraction grating is provided to be a face having the planar shape is as follows. Specifically, in the resin lens which has used the diffraction grating, efficiency loss (diffraction loss) occurs and the diffracted light of other orders of diffraction other than the designed order of the diffraction is generated, by the deterioration of working accuracy, which originates in tooling R that is formed when a diffraction shape (blaze) is worked and a working loss due to a damage of a working tool such as a diamond byte, and by the deterioration of transfer accuracy in molding, and the quantity of stray light (flare and glare) increases. This problem can be reduced by a process of forming the lens face on which the diffraction grating is provided, so as to be a planar shape perpendicular to an optical axis (plane or face which has little change of shape and small tangent angle and is close to plane).

In the subject matter described in the eighth aspect, the light distribution pattern can include a plurality of individual light distribution patterns which are arranged in one row in a horizontal direction or in a matrix form, and in which turning-on and turning-off of the light are controlled individually, in the subject matter described in any one of the first aspect to the seventh aspect.

According to the subject matter described in the eighth aspect, the color bleeding can be improved which is formed in the vicinity of each boundary line between light and shade of the plurality of individual light distribution patterns, while image-forming properties of each of the plurality of the individual rectangular light distribution patterns are kept which are arranged in one row in a horizontal direction or in a matrix form, and in which turning-on and turning-off of the light are controlled individually.

In the subject matter described in the ninth aspect, the individual light distribution pattern can be a rectangular light distribution pattern of which each side is a boundary line between light and shade, in the subject matter according to the eighth aspect.

According to the subject matter described in the ninth aspect, the color bleeding can be improved that is formed in the vicinity of the boundary lines between light and shade, which constitute respective sides of the plurality of the rectangular light distribution patterns, while image-forming properties of each of the plurality of the rectangular light distribution patterns are kept which are arranged in one row in a horizontal direction or in a matrix form, and in which turning-on and turning-off of the light are controlled individually.

In the subject matter described in the tenth aspect, the diffraction grating can be provided in an annular region closer to the outer periphery, through which light that causes color bleeding passes, on the lens face in the side opposite to the light source on the resin lens out of the two resin lenses which is arranged closer to the light source unit, and not provided in a region on an inner side of the annular region, in the subject matter described in the first aspect.

One advantage of restricting the range in which the diffraction grating is provided as in the subject matter described in the tenth aspect is as follows. Specifically, the range in which the diffraction grating is provided is restricted to the annular region that is closer to the outer periphery, and thereby the range of the occurrence of the diffraction loss is minimized, the efficiency is enhanced, the stray light can be reduced, and also the deterioration of the working accuracy of the diffraction grating due to the damage of the working tool such as the diamond byte can be mitigated.

In the subject matter described in the eleventh aspect, the diffraction grating can be provided in an annular region closer to the outer periphery, through which light that causes color bleeding passes, on the lens face in the side opposite to the light source on the resin lens out of the two resin lenses which is arranged closer to the light source unit, and not provided in a region on an inner side of the annular region, in the subject matter according to the second aspect.

One advantage of restricting the range in which the diffraction grating is provided as in the subject matter described in the eleventh aspect is as follows. Specifically, the range in which the diffraction grating is provided is restricted to the annular region that is closer to the outer periphery, and thereby the range of the occurrence of the diffraction loss is minimized, the efficiency is enhanced, the stray light can be reduced, and also the deterioration of the working accuracy of the diffraction grating due to the damage of the working tool such as the diamond byte can be mitigated.

As has been described above, the presently disclosed subject matter can provide a projector type headlight which uses a resin lens that can keep a grating shape and can improve color bleeding in the vicinity of a boundary line between light and shade in a predetermined light distribution pattern, even when the diameter has been enlarged (to φ 60 mm or more, for instance).

DETAILED DESCRIPTION

Hereafter, a lamp unit 10 (corresponding to projector type headlight of the presently disclosed subject matter) for vehicles, which is a first embodiment of the presently disclosed subject matter, is described with reference to drawings.

Figure 1:
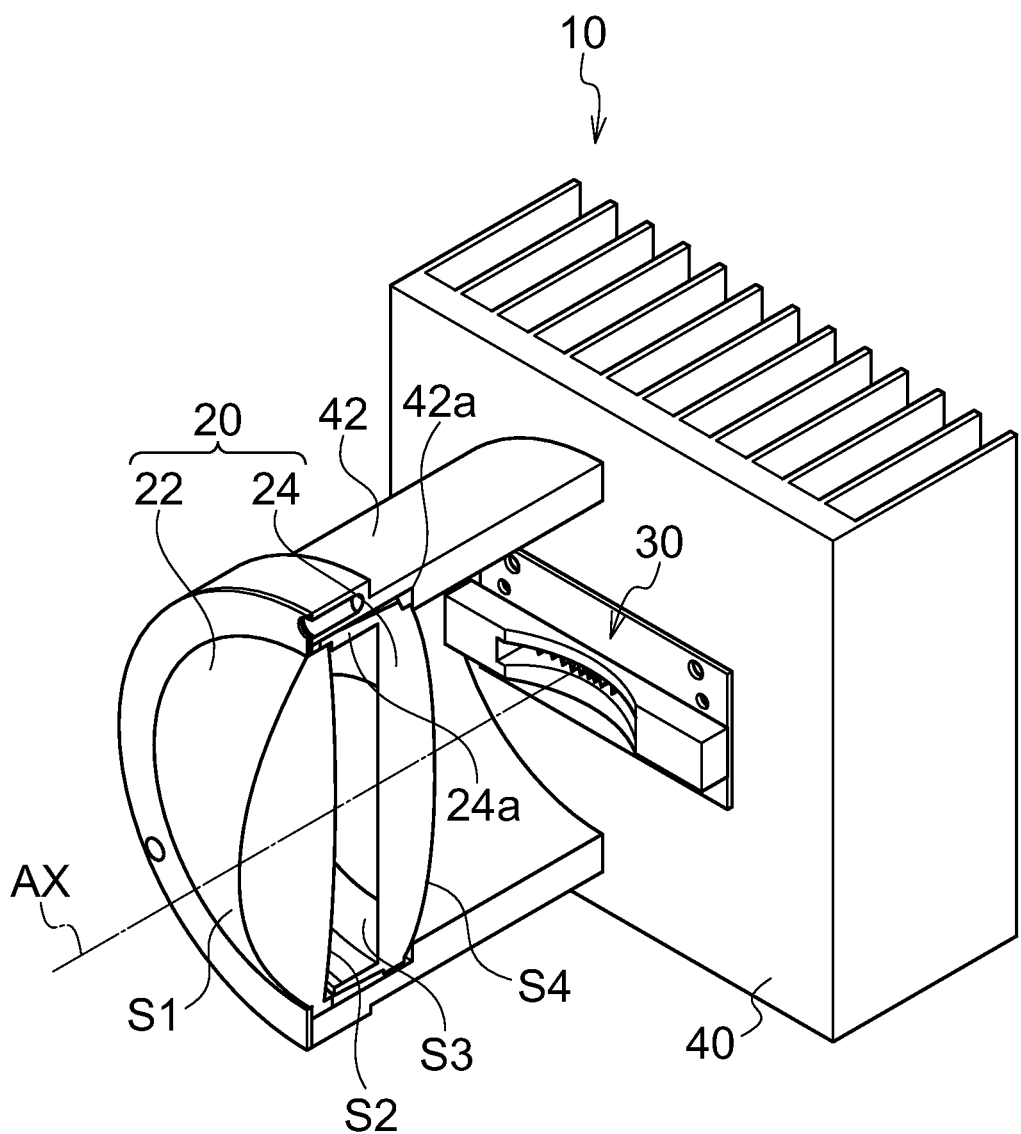
FIG. 1 is a perspective view of a lamp unit 10 for vehicles.
Figure 2A:
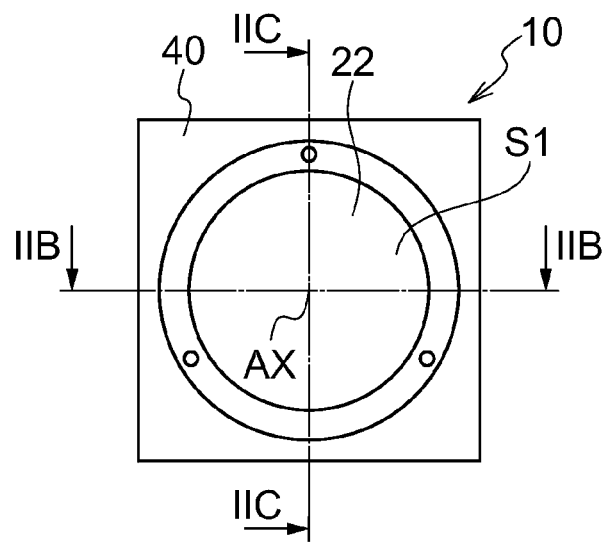
FIG. 2A is a front view of a lamp unit 10 for vehicles.
Figure 2B:
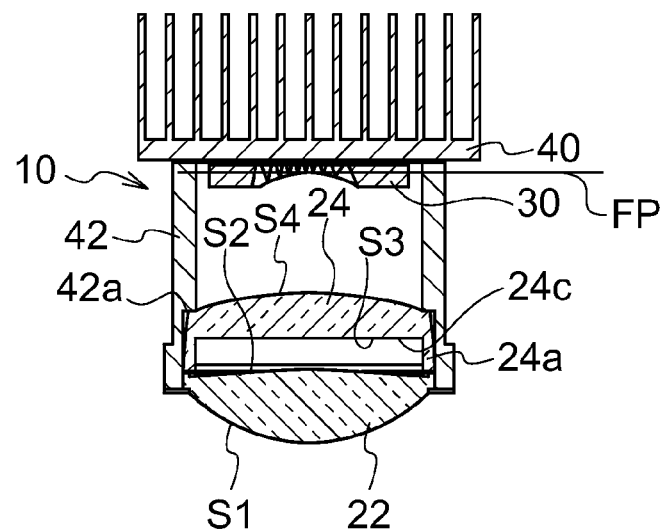
FIG. 2B is a cross-sectional view taken along the line IIB-IIB of the lamp unit 10 of FIG. 2A.
Figure 2C:
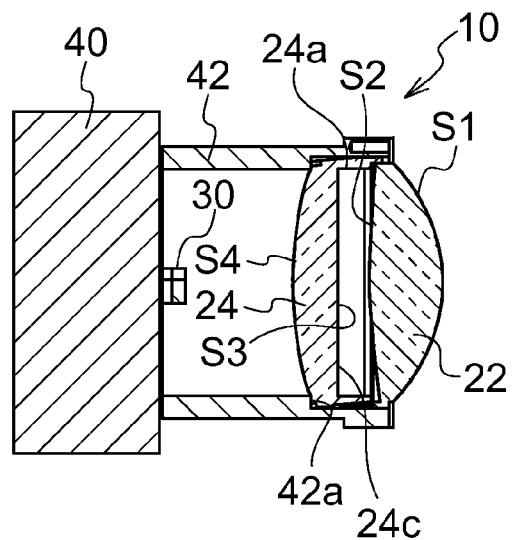
FIG. 2C is a cross-sectional view taken along the line IIC-IIC of the lamp unit 10 of FIG. 2A.

FIG. 1 is a perspective view of the lamp unit 10 for vehicles, FIG. 2A is a front view of the lamp unit 10 for vehicles, FIG. 2B is a cross-sectional view taken along the line IIB-IIB of lamp unit 10 of FIG. 2A, and FIG. 2C is a cross-sectional view taken along the line IIC-IIC of the lamp unit 10 of FIG. 2A.

As is illustrated in FIG. 1 and FIGS. 2A-2C, a lamp unit 10 for vehicles is a direct projection type (referred to as direct type as well) of a lamp unit which is used for a projector type headlight (so-called head lamp), and has a projection lens 20 which is arranged on an optical axis AX that extends in a longitudinal direction of a vehicle, a light source unit 30 which is arranged further to a rear side than a back side focal plane FP of the projection lens 20, and the like. The focal plane FP may be for example a plain surface passing through a focal point of the projection lens 20.

The projection lens 20 includes two resin lenses (first resin lens 22 and second resin lens 24) which are arranged so as to be separated from each other at a fixed distance on the optical axis AX. The projection lens 20 (including two resin lenses 22 and 24) is held by a lens barrel 42 which is fixed to a supporting member 40, and is arranged on the optical axis AX. A step portion 42a which extends in a circumferential direction is formed in the head side of an internal perimeter surface of the lens barrel 42. This step portion 42a is used for accommodating and holding the projection lens 20 there.

The projection lens 20 is inserted into the lens barrel 42 until the second resin lens 24 abuts on the step portion 42a, and is fixed to the lens barrel 42 with a known device such as a screw, an adhesive and a snap fitting structure.

The light source unit 30 is a light source unit which is configured so as to form a light source image that emits forward through the projection lens 20 (including two resin lenses 22 and 24) and forms a light distribution pattern including a boundary line between light and shade, substantially on (i.e., on, at, or in the vicinity of) the back side focal plane FP of the projection lens 20, and is fixed to a supporting member 40 (radiating member and supporting member). Light source units, for instance, described in Japanese Patent Application Laid-Open No. 2011-249080 and Japanese Patent Application Laid-Open No. 2009-070679, can be used for this light source unit 30.

The projection lens 20 projects a light source image which is formed on the back side focal plane FP by the light source unit 30, on a virtual vertical screen (which is arranged approximately 25 m frontward from vehicle, for instance) which directly faces a front face of the vehicle, in a form of an inverted image. Thereby, light distribution patterns as are illustrated in FIGS. 3A and 3B are formed.

Figure 3A:
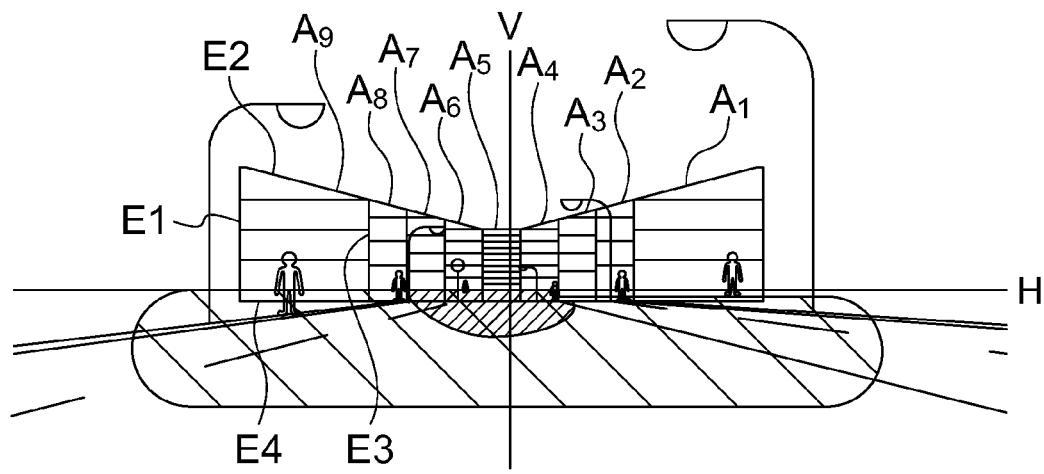
FIG. 3A is an example of a light distribution pattern which is formed by a light source unit described in Japanese Patent Application Laid-Open No. 2011-249080.

FIG. 3A is an example of the light distribution pattern which is formed when the light source unit described in Japanese Patent Application Laid-Open No. 2011-249080 has been employed as the light source unit 30. This light distribution pattern includes a plurality of individual light distribution patterns $A_1$ to $A_9$ which are arranged in one row in a horizontal direction, and in which turning-on and turning-off of the light are controlled individually. Each of the individual light distribution patterns $A_1$ to $A_9$ is formed into a rectangular light distribution pattern of which each side is boundary lines E1 to E4 between light and shade.

Figure 3B:
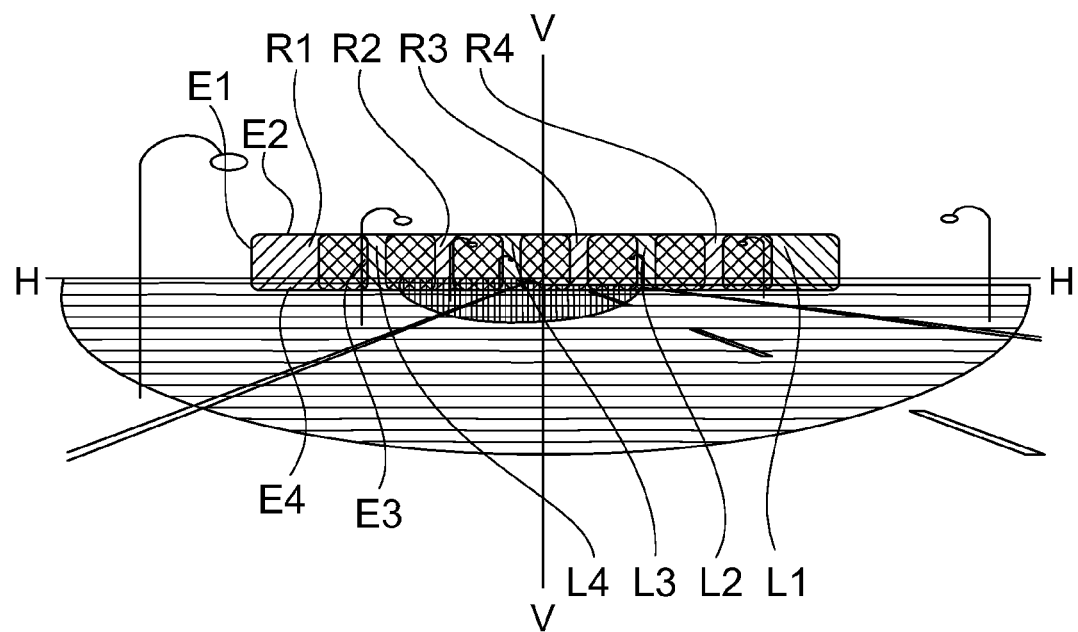
FIG. 3B is an example of a light distribution pattern which is formed by a light source unit described in Japanese Patent Application Laid-Open No. 2009-070679.

FIG. 3B is an example of a light distribution pattern which is formed when the light source unit described in Japanese Patent Application Laid-Open No. 2009-070679 has been employed as the light source unit 30. This light distribution pattern includes a plurality of individual light distribution patterns R1 to R4 (or L1 to L4) which are arranged in one row in a horizontal direction, and in which turning-on and turning-off of the light are controlled individually. Each of the individual light distribution patterns R1 to R4 (or L1 to L4) is formed into a rectangular light distribution pattern of which each side is boundary lines E1 to E4 between light and shade.

For information, the individual light distribution patterns are not limited to a plurality of individual light distribution patterns (for instance, rectangular light distribution pattern of which each side is boundary line between light and shade) which are arranged in one row in a horizontal direction and in which turning-on and turning-off of the light are controlled individually, but may be a plurality of individual light distribution patterns (for instance, rectangular light distribution pattern of which each side is boundary line between light and shade) which are arranged in a matrix form and in which turning-on and turning-off of the light are controlled individually.

For information, a light source of the light source unit 30 may be a white light source in which a semiconductor light emitting element such as an LED (light emitting diode) and an LD (laser diode) is combined with a fluorescent material, or may be a bulb light source such as a tungsten halogen lamp and an HID electric bulb (High Intensity Discharge lamp).

The first resin lens 22 is a resin lens having a large diameter (ϕ 60 mm or more, and for instance, ϕ 70 mm) and a positive power, includes a lens face S1 in the side opposite to the light source and a lens face S2 in the light source side, and is arranged distant from the light source unit 30, as is illustrated in FIG. 1 and FIG. 2. Incidentally, the lens having the positive power means a lens of which the focal length is positive (which acts so as to concentrate light). In the present embodiment, both of the lens face S1 in the side opposite to the light source and the lens face S2 in the light source side are formed as a lens face having the positive power.

The second resin lens 24 is a resin lens having a large diameter (ϕ 60 mm or more, and for instance, ϕ 70 mm) and a positive power, includes a lens face S3 in the side opposite to the light source and a lens face S4 in the light source side, and is arranged closer to the light source unit 30 (wall thickness: for instance, 23 mm at the maximum), as is illustrated in FIG. 1 and FIG. 2. Incidentally, in the present embodiment, the lens face S3 in the side opposite to the light source is formed approximately as a plane, and the lens face S4 in the light source side is formed as a lens face having the positive power.

An example of the focal length (unit: mm) of each of the resin lenses 22 and 24 is shown in the following table.

TABLE 1

| First resin lens | Second resin lens |
|---|---|
| 68 | 292 |

An example of the curvature (unit: 1/mm) of each of the lens faces is shown in the following table.

TABLE 2

| Lens face S1 | Lens face S2 | Lens face S3 | Lens face S4 |
|---|---|---|---|
| 2.44E−02 | −6.52E−03 | 0.00E+00 | −6.93E−03 |

Figure 4:
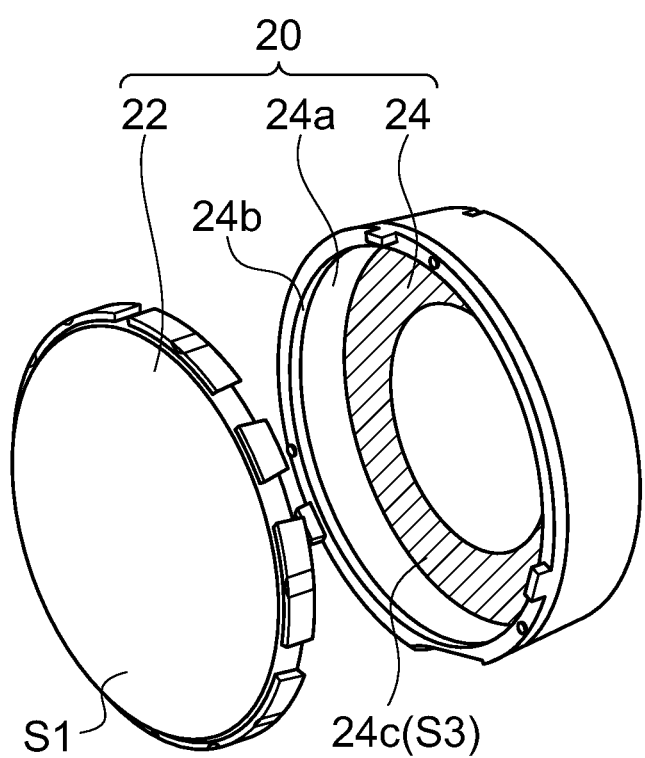
FIG. 4 is an exploded perspective view of a projection lens 20.
Figure 5:
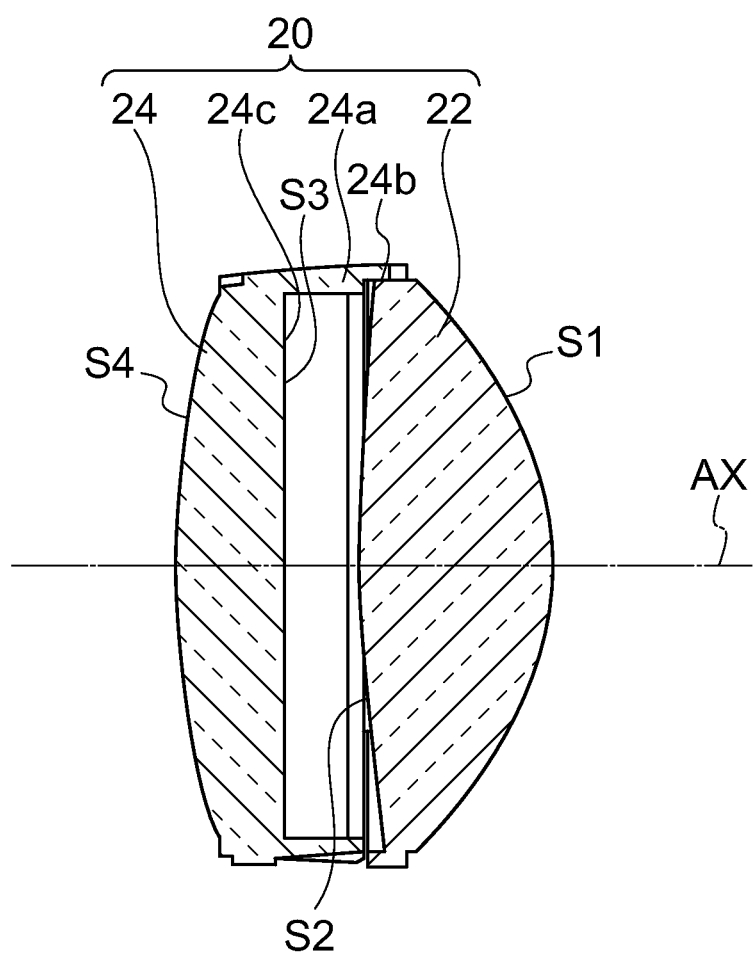
FIG. 5 is a cross-sectional view taken along the line IIB-IIB of the projection lens 20 in the lamp unit 10 of FIG. 2A.

FIG. 4 is an exploded perspective view of the projection lens 20, and FIG. 5 is a cross-sectional view taken along the line IIB-IIB of the projection lens 20 in the lamp unit 10 for vehicles, which has been illustrated in FIG. 2A.

As is illustrated in FIG. 4 and FIG. 5, the second resin lens 24 includes a cylinder part 24a which extends to the first resin lens 22 side from the perimeter thereof. A step portion 24b which extends to a circumferential direction is formed in the head side of an internal perimeter surface of the cylinder part 24a. This step portion 24b is used for accommodating and holding the first resin lens 22 there. The first resin lens 22 is inserted into the cylinder part 24a until the peripheral region (ring-shaped region) out of the lens face S2 in the light source side abuts to the step portion 24b, and is fixed to the cylinder part 24a with a known device such as a screw, an adhesive, and a snap fitting structure.

The first resin lens 22 and the second resin lens 24 are each formed by a process of injecting a transparent resin such as an acrylate resin (e.g., PMMA: Poly(methyl methacrylate)) into a die, and cooling and solidifying the injected resin.

The lens face S1 in the side opposite to the light source of the first resin lens 22 is formed into a lens face having a largest positive power out of the lens faces S1 to S4, in order to enlarge an aperture of an optical system (in order to increase illumination efficiency) (see above described Table 2). For information, the positive power of the lens face means that the sign of the curvature of the lens face is positive, in the case of the lens face in the side opposite to the light source, and means that the sign of the curvature of the lens face is negative, in the case of the lens face in the light source side.

A diffraction grating 24c (DOE: Diffractive Optical Element) is provided on the projection lens 20 (see hatching region in FIG. 4).

It has been known that in a projector type headlight which is configured so as to form a predetermined light distribution pattern including a boundary line between light and shade (referred to as cutoff line as well) by the light which emits forward through a projection lens, color bleeding (referred to as color breakup as well) which originates in the chromatic aberration of the projection lens occurs in the vicinity of the boundary line between light and shade (see boundary lines E1 to E4 between light and shade in FIGS. 3A and 3B, for instance). In particular, when the projection lens is made from resin, the projection lens shows large dispersion as compared to a projection lens made from glass, and accordingly the color bleeding which originates in the chromatic aberration remarkably occurs. The diffraction grating 24c is used for canceling this chromatic aberration.

Figure 6A:
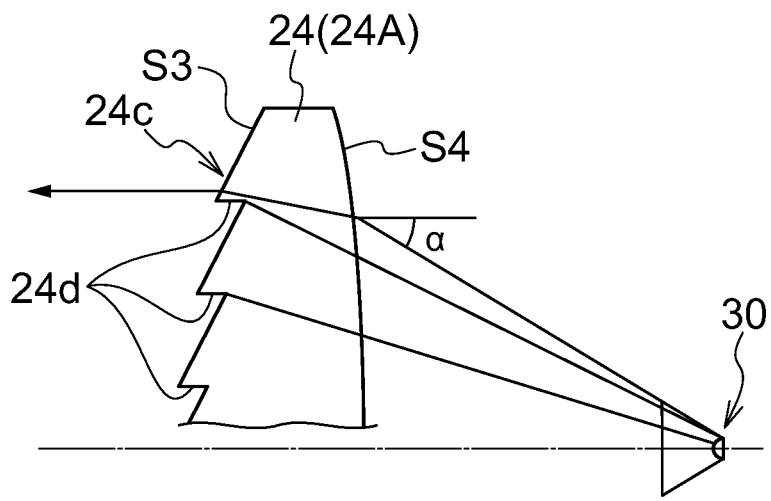
FIG. 6A is a view illustrating such a state that light emitted from a light source unit 30 is incident on an edge portion 24d (step portion) of a diffraction grating 24c in the case where the diffraction grating 24c has been provided on a lens face S3 in a side opposite to the light source.

The diffraction grating 24c is, for instance, a blaze type of concentric diffraction grating (having saw-tooth cross section). FIG. 6A is a cross-sectional view of a blaze type of diffraction grating 24c, and is drawn larger than an actual diffraction grating, for the sake of convenience of the description. This blaze type of diffraction grating can be designed by using a known technique, for instance, such as a phase difference function (see International Publication No. WO 2009/028686, for instance).

The dispersion characteristics of a dioptrics element (first resin lens 22, for instance) are opposite to those of a diffractive optical element (diffraction grating 24c, for instance). Specifically, the dioptrics element has such characteristics that light of short wavelength (light of wavelength of bluish color) is well refractive and light of long wavelength (light of wavelength of reddish color) is not refractive, but the diffractive optical element has such characteristics on the contrary that light of long wavelength (light of wavelength of reddish color) is well refractive and light of short wavelength (light of wavelength of bluish color) is not refractive. In addition, the diffractive optical element also has such characteristics that when a grating period is changed, a direction of diffraction changes, and that the smaller the grating period is, the larger the amount of diffraction (angle of diffraction) is.

By such a structure that a grating shape of the diffraction grating 24c is appropriately designed based on the above described characteristics, the chromatic aberration of the light can be cancelled which is emitted from the light source unit 30 and is emitted forward through two resin lenses 22 and 24, and color bleeding in the vicinity of the boundary line between light and shade (see boundary lines E1 to E4 between light and shade in FIGS. 3A and 3B, for instance) can be improved.

Incidentally, the diffraction grating 24c may be designed so as to cancel chromatic aberration of the light which is emitted from the light source unit 30 and is emitted forward through two resin lenses 22 and 24. The diffraction grating 24c is not limited to the blaze type of diffraction grating, but may also be a diffraction grating having other structures.

The diffraction grating 24c is provided on the second resin lens 24 which has a thinner wall thickness out of two resin lenses 22 and 24. One advantage of providing the diffraction grating 24c on the second resin lens 24 having the thinner wall thickness is as follows.

Specifically, the second resin lens 24 having the thinner wall thickness can better suppress the aggravation of molding accuracy, which originates in sink and deformation at the time of molding, than the first resin lens 22 having the thicker wall thickness. Accordingly, by such a structure in which the diffraction grating 24c is provided on the second resin lens 24 having the thinner wall thickness, the grating shape of the diffraction grating 24c can be kept and color bleeding in the vicinity of the boundary line between light and shade (see boundary lines E1 to E4 between light and shade in FIGS. 3A and 3B, for instance) in the predetermined light distribution pattern can be improved, even when the diameter of the projection lens 20 (including two resin lenses 22 and 24) has been enlarged (to φ 60 mm or more, for instance).

The diffraction grating 24c is provided on a lens face S3 in the side opposite to the light source on the second resin lens 24. One advantage of providing the diffraction grating 24c on the lens face S3 in the side opposite to the light source on the second resin lens 24 is as follows. Specifically, when the diffraction grating 24c is provided on the lens face S3 in the side opposite to the light source on the second resin lens 24, the light which is incident on an edge portion 24d (step portion) of the diffraction grating 24c decreases as compared to the case where the diffraction grating 24c is provided on the lens face S4 in the light source side of the second resin lens 24, and accordingly a direction of the beam of the light which is incident on the diffraction grating 24c can be controlled toward a direction in which diffraction loss is little (stray light is little), and the occurrence of the diffraction loss (stray light) can be reduced.

Figure 6B:
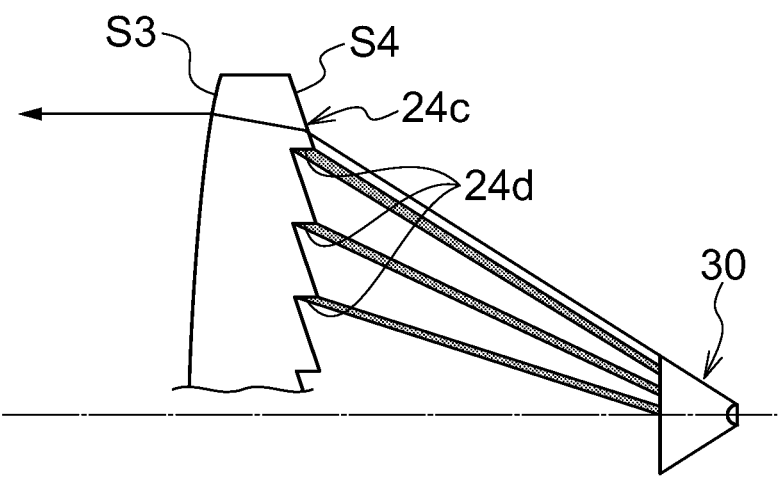
FIG. 6B is a view illustrating such a state that light emitted from the light source unit 30 is incident on an edge portion 24d (step portion) of a diffraction grating 24c in the case where the diffraction grating 24c has been provided on a lens face S4 in a light source side.

This advantage is described below with reference to FIG. 6A and FIG. 6B. FIG. 6A is a view illustrating such a state that light emitted from the light source unit 30 is incident on the edge portion 24d (step portion) of the diffraction grating 24c in the case where the diffraction grating 24c has been provided on the lens face S3 in the side opposite to the light source, and FIG. 6B is a view illustrating such a state that light from the light source unit 30 is incident on the edge portion 24d (step portion) of the diffraction grating 24c in the case where the diffraction grating 24c has been provided on the lens face S4 in a light source side. When FIG. 6A is compared to FIG. 6B, it is understood that the light which is emitted from the light source unit 30 and is incident on the edge portion 24d (step portion) of the diffraction grating 24c is less in the case where the diffraction grating 24c is provided on the lens face S3 in the side opposite to the light source (see FIG. 6A).

As is illustrated in FIG. 2B and FIG. 2C, the lens face S3 in the side opposite to the light source on the second resin lens 24 arranged in the side closer to the light source unit 30 is formed to have a face in which a change of the shape of the lens face is smaller than that of the lens face S1 in the side opposite to the light source on the first resin lens 22 arranged distant from the light source unit 30. For information, a phrase that the change of the shape is small means that a change of a tangent angle is small. Specifically, as is illustrated in FIG. 5 and the like, the lens face S3 (lens face S3 on which diffraction grating 24c is provided) in the side opposite to the light source on the second resin lens 24 which is arranged in the side closer to the light source unit 30 is formed to be a face having a planar shape perpendicular to an optical axis AX (plane or face which has little change of shape and small tangent angle and is close to plane). One advantage of forming the lens face S3 on which the diffraction grating 24c is provided to be a face having a planar shape is as follows.

Specifically, the diffraction grating 24c is formed by a process of preparing a die by cutting and working a base material such as a hard metal with the use of a working tool such as a diamond byte, injecting a transparent resin such as an acrylic resin (e.g., PMMA) into this die, and cooling and solidifying the injected resin.

In a resin lens which has used the diffraction grating (for instance, second resin lens 24), the grating shape of the diffraction grating 24c is determined so that the light quantity of a designed order of diffraction (usually, primary diffracted light) increases and the light quantity of the diffracted light of other orders of diffraction decreases, which becomes stray light.

However, in the resin lens which has used the diffraction grating (for instance, second resin lens 24), efficiency loss (diffraction loss) occurs and the diffracted light of other orders of diffraction other than the designed order of the diffraction is generated, by the deterioration of working accuracy, which originates in tooling R that is formed when a diffraction shape (blaze) is worked and a working loss due to a damage of a working tool such as a diamond byte, and by the deterioration of transfer accuracy in molding, and the quantity of stray light (flare and glare) increases. This problem is reduced by a process of forming the shape of the lens face S3 on which the diffraction grating 24c is provided, so as to be a planar shape perpendicular to an optical axis AX (plane or face which has little change of shape and small tangent angle and is close to plane).

Figure 7A:
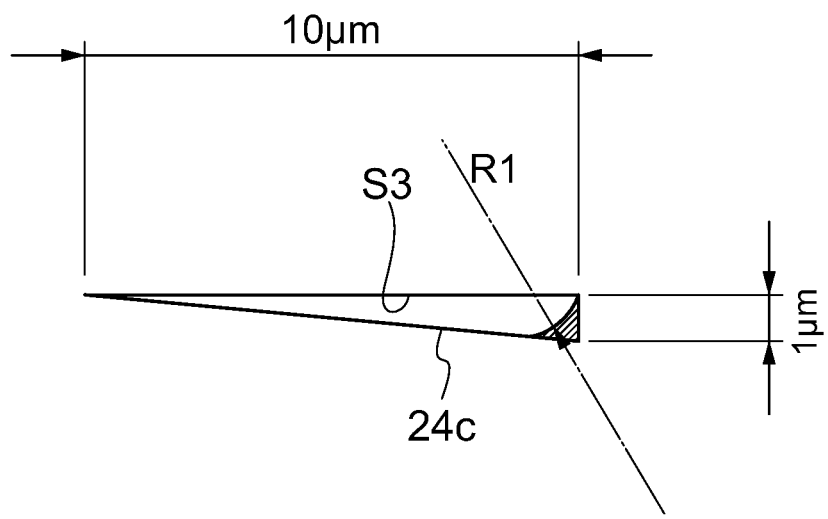
FIG. 7A is a view illustrating a working loss (see hatching region in FIG. 7A) in the case where the lens face S3 on which the diffraction grating 24c is provided is formed to be a plane (face having small tangent angle 0 deg)
Figure 7B:
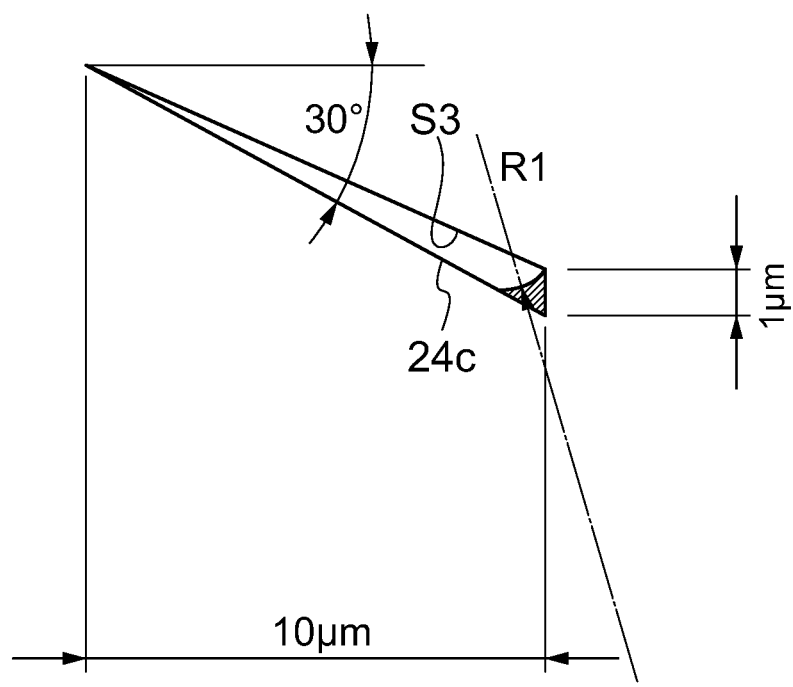
FIG. 7B is a view illustrating a working loss (see hatching region in FIG. 7B) in the case where the lens face S3 on which the diffraction grating 24c is provided is formed to be a face having a large tangent angle 30 deg.

This advantage is described below with reference to FIG. 7A and FIG. 7B. FIG. 7A illustrates a working loss (see hatching region in FIG. 7A) in the case where the lens face S3 on which the diffraction grating 24c is provided is formed to be a plane (face having small tangent angle 0 deg), and FIG. 7B illustrates a working loss (see hatching region in FIG. 7B) in the case where the lens face S3 on which the diffraction grating 24c is provided is formed to be a face having a large tangent angle 30 deg. When FIG. 7A is compared with FIG. 7B, it is understood that when the shape of the diffraction grating 24c is formed to be a plane (face having small tangent angle 0 deg) (see FIG. 7A), the working loss becomes less, and a diffraction loss and the stray light which originate in the working loss can be more suppressed.

The diffraction grating 24c is provided in an annular region closer to the outer periphery (see hatching region in FIG. 4), through which light that causes color bleeding passes, out of the lens face S3 in the side opposite to the light source on the second resin lens 24, and is not provided in a region on an inner side of the annular region. An advantage of thus restricting a range in which the diffraction grating 24c is provided is as follows. Specifically, the range in which the diffraction grating 24c is provided is restricted to the annular region that is closer to the outer periphery out of the lens face S3 in the side opposite to the light source on the second resin lens 24, and thereby the range of the occurrence of the diffraction loss is minimized, the efficiency is enhanced, the stray light can be reduced, and also the deterioration of the working accuracy of the diffraction grating due to the damage of the working tool such as the diamond byte can be mitigated.

The lens face S4 in the light source side on the second resin lens 24 is formed to be a lens face having a positive power so that the incident angle of light incident on the diffraction grating 24c from the light source unit 30 becomes small.

A projection lens 20 having the above described structure projects a light source image which is formed on the back side focal plane FP thereof by the light source unit 30, onto a virtual vertical screen that directly faces the front face of a vehicle (which is arranged approximately 25 m frontward of vehicle, for instance), in a form of an inverted image. Thereby, a light distribution pattern is formed on the virtual vertical screen, which includes a plurality of individual light distribution patterns that are arranged in one row in a horizontal direction (or in matrix form) and in which turning-on and turning-off of the light are controlled individually (see rectangular light distribution patterns $A_1$ to $A_9$ in FIG. 3A, and rectangular light distribution patterns R1 to R4 (or L1 to L4) in FIG. 3B, for instance).

This light distribution pattern shall show the improved color bleeding in the vicinity of boundary lines between light and shade (for instance, see boundary lines E1 to E4 between light and shade in FIGS. 3A and 3B), which constitute respective sides of the individual rectangular light distribution patterns, while keeping image-forming properties of each of the individual rectangular light distribution patterns, by the action of the projection lens 20 having the above described structure.

For information, it is acceptable to form an anti-reflection coating such as an AR coating, on each of the lens faces S1 to S4, in order to enhance the transmissivity. In addition, it is also acceptable to subject at least one lens face (such as, lens face S3 in surface side of second resin lens 24, and the like) out of the lens faces S1 to S4 to embossing or treatment such as microtexture (fine unevenness), in order to obscure the light distribution pattern. In addition, it is also acceptable to form a part of at least one lens face out of the lens faces S1 to S4 so as to be a free-form surface, for the purpose of intentionally deforming the light distribution pattern. In addition, the light distribution pattern to be projected may be a low beam, a high beam or an intermediate beam pattern therebetween.

Incidentally, in the present embodiment, the example has been described in which a projector type headlight of the presently disclosed subject matter is a so-called direct projection type (referred to as direct type as well) of a lamp unit 10 for vehicles, but the presently disclosed subject matter is not limited to the example. For instance, the projector type headlight of the presently disclosed subject matter may be a general projector type of lamp unit for vehicles, which has a reflector and a shade.

As has been described above, in the lamp unit 10 for vehicles of the present embodiment, the projection lens 20 includes two resin lenses 22 and 24. Thereby, the structure has the following advantages.

Firstly, the structure can reduce a difference in wall thickness (e.g. a difference in wall thickness between a central part of a lens and a peripheral part of a lens in an optical axis AX direction) of individual resin lenses 22 and 24, as compared to the case where the projection lens 20 is structured from one resin lens. Because of this, the structure can suppress the aggravation of molding accuracy, which originates in sink and deformation of individual resin lenses 22 and 24 at the time of molding, as compared to the case where the projection lens 20 is structured from one resin lens. As a result, the grating shape of the diffraction grating 24c can be kept and color bleeding in the vicinity of the boundary line between light and shade (see boundary lines E1 to E4 between light and shade in FIGS. 3A and 3B, for instance) in the predetermined light distribution pattern can be improved, even when the diameter of the projection lens 20 (including two resin lenses 22 and 24) has been enlarged (to ϕ 60 mm or more, for instance), as compared to the case where the projection lens 20 is structured from one resin lens. Secondly, the structure can decrease the wall thickness of individual resin lenses 22 and 24, and thereby can shorten a molding period of time, as compared to the case where the projection lens 20 is structured from one resin lens. Thirdly, the structure can enlarge the diameter of the projection lens 20, and thereby can enhance luminous intensity and light quantity, as compared to the case where the projection lens 20 is structured from one resin lens. Furthermore, individual resin lenses 22 and 24 are formed from a transparent resin, and accordingly there is also such an advantage as to be capable of achieving weight saving of the lamp unit 10 for vehicles, as compared to the case where individual resin lenses 22 and 24 are formed from a glass material.

In addition, in the lamp unit 10 for vehicles of the present embodiment, the diffraction grating 24c is provided on the lens face S3 in or on the side opposite to the light source on the second resin lens 24 which is arranged in a side closer to the light source unit 30, out of the two resin lenses 22 and 24. Thereby, the light which is incident on the edge portion 24d (step portion) of the diffraction grating 24c decreases, and accordingly a direction of the beam of the light which is incident on the diffraction grating 24c can be controlled toward a direction in which a diffraction loss is little (stray light is little), and the occurrence of the diffraction loss (stray light) can be reduced.

In addition, in the lamp unit 10 for vehicles of the present embodiment, the diffraction grating 24c is provided on the second resin lens 24 which has a thinner wall thickness out of the two resin lenses 22 and 24. Thereby, the structure has the following advantages. Specifically, the second resin lens 24 having the thinner wall thickness can more suppress the aggravation of molding accuracy, which originates in sink and deformation at the time of molding, as compared to the first resin lens 22 having the thicker wall thickness. Accordingly, by such a structure that the diffraction grating 24c is provided on the second resin lens 24 having the thinner wall thickness, the grating shape of the diffraction grating 24c can be kept and color bleeding in the vicinity of the boundary line between light and shade (see boundary lines E1 to E4 between light and shade in FIGS. 3A and 3B, for instance) in the predetermined light distribution pattern can be improved, even when the diameter of the projection lens 20 (two resin lenses 22 and 24) has been enlarged (to φ 60 mm or more, for instance).

In addition, in the lamp unit 10 for vehicles of the present embodiment, the diffraction grating 24c is provided on the lens face S3 having a planar shape perpendicular to the optical axis AX (plane or face which has little change of shape and small tangent angle and is close to plane). Thereby, the lamp unit can reduce the working loss due to the damage of the working tool such as the diamond byte, as compared to the case where the diffraction grating 24c is provided on a lens face other than the lens face having the planar shape. As a result, it becomes possible to reduce a diffraction loss and the stray light which originate in the working loss.

In addition, the lamp unit 10 for vehicles of the present embodiment can improve color bleeding in the vicinity of each boundary line between light and shade of a plurality of individual light distribution patterns (see boundary lines E1 to E4 between light and shade in FIGS. 3A and 3B, for instance), while keeping image-forming properties of each of a plurality of the individual light distribution patterns (see rectangular light distribution patterns A₁ to A₉ in FIG. 3A, and rectangular light distribution patterns R1 to R4 (or L1 to L4) in FIG. 3B, for instance) which are arranged in one row in a horizontal direction or in a matrix form and in which turning-on and turning-off of the light are controlled individually.

In addition, in the lamp unit 10 for vehicles of the present embodiment, the range in which the diffraction grating 24c is provided is restricted to the annular region that is closer to the outer periphery, out of the lens face S3 in the side opposite to the light source on the second resin lens 24, and thereby the range of the occurrence of the diffraction loss is minimized, the efficiency is enhanced, the stray light can be reduced, and also the deterioration of the working accuracy of the diffraction grating due to the damage of the working tool such as the diamond byte can be mitigated.

Next, a lamp unit 10A for vehicles (corresponding to projector type headlight of the presently disclosed subject matter) using a projection lens 20A which includes three resin lenses (first resin lens 22A, second resin lens 24A and third resin lens 26A) is described below with reference to the drawings, as a second embodiment of the presently disclosed subject matter.

Figure 8:
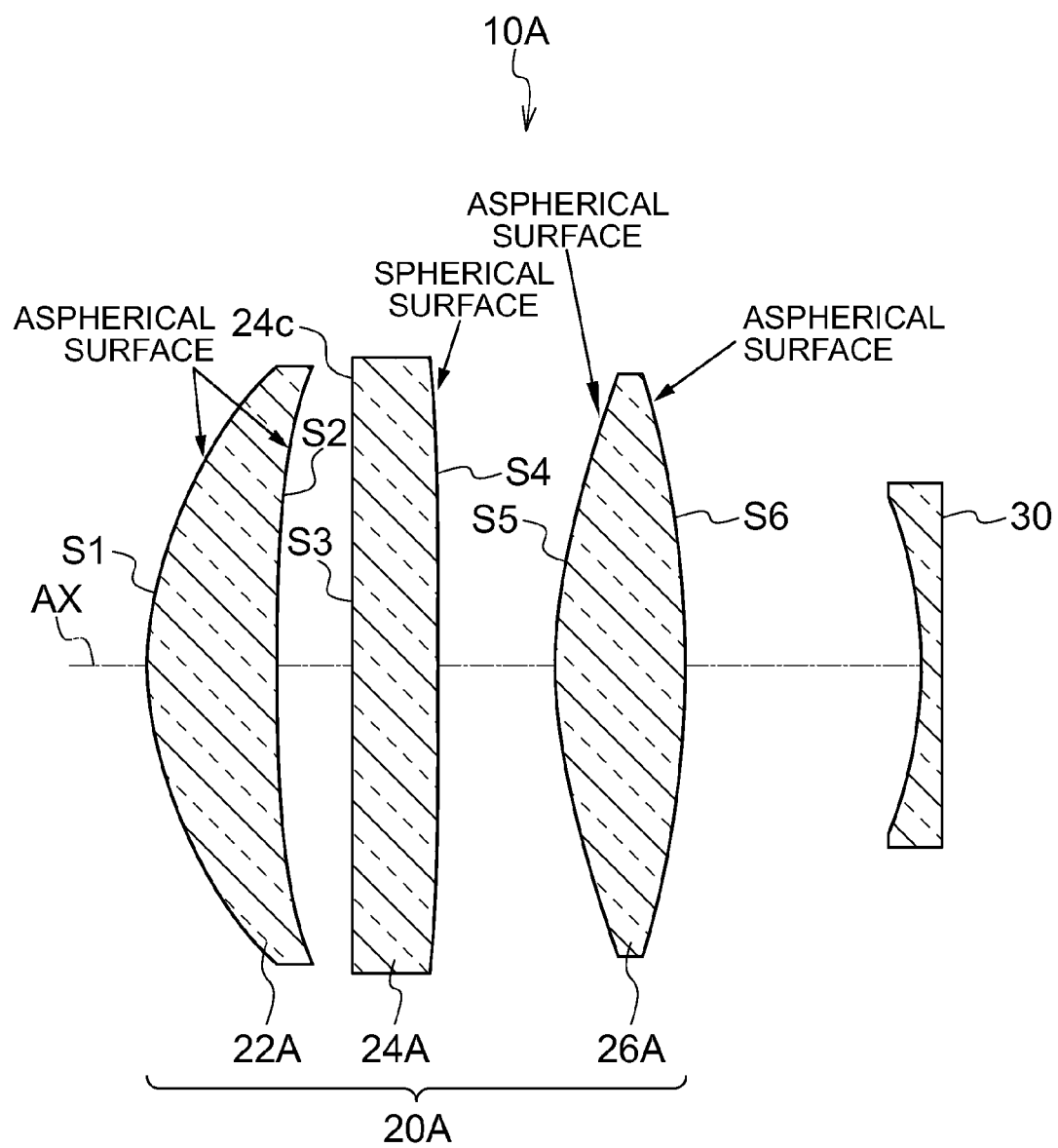
FIG. 8 is a view for describing an arrangement of three resin lenses (first resin lens 22A, second resin lens 24A and third resin lens 26A) which constitute a projection lens 20A, and of a light source unit 30.

FIG. 8 is a view for describing the arrangement of three resin lenses (first resin lens 22A, second resin lens 24A and third resin lens 26A) which are included in the projection lens 20A, and of a light source unit 30.

The lamp unit 10A for vehicles is different from the lamp unit 10 for vehicles of the first embodiment in the point that the lamp unit 10A in the present embodiment uses a projection lens 20A which includes the three resin lenses (first resin lens 22A, second resin lens 24A and third resin lens 26A). Except for the above point, the lamp unit 10A for vehicles in the present embodiment has a similar structure to that in the lamp unit 10 for vehicles of the first embodiment. Hereafter, points different from those in the lamp unit 10 for vehicles of the first embodiment is mainly described, the same structure as that in the lamp unit 10 for vehicles of the first embodiment is designated by the same reference numeral, and the description is omitted.

The projection lens 20A includes the three resin lenses (first resin lens 22A, second resin lens 24A and third resin lens 26A) which are arranged at fixed spaces on the optical axis AX. The projection lens 20A (three resin lenses 22A, 24A and 26A) is held in a lens barrel that is fixed by a supporting member, (which are not illustrated either), in a similar way to that in the first embodiment, and is arranged on the optical axis AX.

The light source unit 30 is a light source unit which is configured so as to form a light source image that emits forward through the projection lens 20A (three resin lenses 22A, 24A and 26A) and forms a light distribution pattern including a boundary line between light and shade, substantially on (i.e., on, at, or substantially at) the back side focal plane FP of the projection lens 20A, and is fixed by the fixing member in a similar way to that in the first embodiment. Light source units which are described, for instance, in Japanese Patent Application Laid-Open No. 2011-249080 and Japanese Patent Application Laid-Open No. 2009-070679 can be used as this light source unit 30.

The projection lens 20A projects the light source image which is formed on the back side focal plane FP by the light source unit 30, on a virtual vertical screen (which is arranged approximately 25 m frontward from vehicle, for instance) which directly faces the front face of the vehicle, in a form of an inverted image. Thereby, light distribution patterns as illustrated in FIGS. 3A and 3B are formed.

The first resin lens 22A is a resin lens having a large diameter (φ 60 mm or more, and for instance, φ 70 mm) and a positive power, includes a lens face S1 in the side opposite to the light source and a lens face S2 in the light source side, and is arranged most distant from the light source unit 30, as is illustrated in FIG. 8. Incidentally, the lens having the positive power means a lens of which the focal length is positive (which acts so as to concentrate light). Incidentally, in the present embodiment, the lens face S1 in the side opposite to the light source is formed as a lens face having the positive power, and the lens face S2 in the light source side is formed as a lens face having a negative power.

The second resin lens 24A is a resin lens having a large diameter (φ 60 mm or more, and for instance, φ 70 mm) and a positive power, includes a lens face S3 in the side opposite to the light source and a lens face S4 in or on the light source side, and is arranged between the first resin lens 22A and the third resin lens 26A, as is illustrated in FIG. 8. In the present embodiment, the lens face S3 in or on the side opposite to the light source is formed approximately as a plane, and the lens face S4 in or on the light source side is formed as a lens face having the positive power.

The third resin lens 26A is a resin lens having a large diameter (ϕ 60 mm or more, and for instance, ϕ 70 mm) and a positive power, includes a lens face S5 in or on the side opposite to the light source and a lens face S6 in or on the light source side, and is arranged closest to the light source unit 30, as is illustrated in FIG. 8. The third resin lens 26A is formed to have the positive power, and thereby decreases an incident angle of the light which is incident on a diffraction grating 24c from the light source unit 30 (wall thickness: maximum 15 mm, for instance). In the present embodiment, both of the lens face S5 in or on the side opposite to the light source and the lens face S6 or on in the light source side are formed as a lens face having the positive power.

An example of the focal length (unit: mm) of each of the resin lenses 22A, 24A and 26A is shown in the following table.

TABLE 3

| First resin lens | Second resin lens | Third resin lens |
|---|---|---|
| 102 | 1012 | 91 |

An example of the curvature (unit: 1/mm) of each of the lens faces is shown in the following table.

TABLE 4

| Lens face S1 | Lens face S2 | Lens face S3 | Lens face S4 | Lens face S5 | Lens face S6 |
|---|---|---|---|---|---|
| 2.01E−02 | 3.15E−04 | 0.00E+00 | −2.00E−03 | 1.48E−02 | −8.12E−03 |

The first resin lens 22A, the second resin lens 24A and the third resin lens 26A are each formed by a process of injecting a transparent resin such as an acrylate resin (e.g., PMMA) into a die, and cooling and solidifying the injected resin.

The lens face S1 in the side opposite to the light source of the first resin lens 22A is formed into a lens face having a largest positive power out of the lens faces S1 to S6, in order to enlarge an aperture of an optical system (in order to increase illumination efficiency) (see above described Table 4). For information, the positive power of the lens face means that the sign of the curvature of the lens face is positive, in the case of the lens face in the side opposite to the light source, and means that the sign of the curvature of the lens face is negative, in the case of the lens face in the light source side.

The diffraction grating 24c (DOE: Diffractive Optical Element) is provided on the projection lens 20A.

It has been known that in a projector type headlight which is configured so as to form a predetermined light distribution pattern including a boundary line between light and shade (referred to as cutoff line as well) by the light which emits forward through a projection lens, color bleeding (referred to as color breakup as well) which originates in a chromatic aberration of the projection lens occurs in the vicinity of the boundary line between light and shade (see boundary lines E1 to E4 between light and shade in FIGS. 3A and 3B, for instance). In particular, when the projection lens is made from resin, the projection lens shows large dispersion as compared to a projection lens made from glass, and accordingly the color bleeding which originates in the chromatic aberration remarkably occurs. The diffraction grating 24c is used for canceling this chromatic aberration.

Incidentally, the diffraction grating 24c may be designed so as to cancel chromatic aberration of the light which is emitted from the light source unit 30 and emits forward through three resin lenses 22A, 24A and 26A. The diffraction grating 24c is not limited to the blaze type of diffraction grating, but may also be a diffraction grating having other structures.

The diffraction grating 24c is provided on the second resin lens 24A which has the thinnest wall thickness out of three resin lenses 22A, 24A and 26A. One advantage of providing the diffraction grating 24c on the second resin lens 24A having the thinnest wall thickness is as follows.

Specifically, the second resin lens 24A having the thinner wall thickness can suppress the aggravation of molding accuracy, which originates in sink and deformation at the time of molding, as compared to the first resin lens 22A and the third resin lens 26A having a thicker wall thickness. Accordingly, by such a structure that the diffraction grating 24c is provided on the second resin lens 24A having the thinnest wall thickness, the grating shape of the diffraction grating 24c can be kept and color bleeding in the vicinity of the boundary line between light and shade (see boundary lines E1 to E4 between light and shade in FIGS. 3A and 3B, for instance) in the predetermined light distribution pattern can be improved, even when the diameter of the projection lens 20A (three resin lenses 22A, 24A and 26A) has been enlarged (to ϕ 60 mm or more, for instance).

The diffraction grating 24c is provided on the lens face S3 in the side opposite to the light source on the second resin lens 24A. An advantage of providing the diffraction grating 24c on the lens face S3 in the side opposite to the light source on the second resin lens 24A is as follows. Specifically, when the diffraction grating 24c is provided on the lens face S3 in the side opposite to the light source on the second resin lens 24A, the light which is incident on an edge portion 24d (step portion) of the diffraction grating 24c decreases as compared to the case where the diffraction grating 24c is provided on the lens face S4 in the light source side of the second resin lens 24A, and accordingly a direction of the beam of the light which is incident on the diffraction grating 24c can be controlled toward a direction in which diffraction loss is little (stray light is little), and the occurrence of the diffraction loss (stray light) can be reduced.

This advantage is described below with reference to FIG. 6A and FIG. 6B. When FIG. 6A is compared to FIG. 6B, it is understood that the light which is emitted from the light source unit 30 and is incident on the edge portion 24d (step portion) of the diffraction grating 24c is less in the case where the diffraction grating 24c is provided on the lens face S3 in the side opposite to the light source (see FIG. 6A).

As is illustrated in FIG. 8, the lens face S3 in or on the side opposite to the light source on the second resin lens 24A arranged in or on the side closer to the light source unit 30 is formed to be a face in which a change of the shape of the lens face is smaller than that of the lens face S1 in or on the side opposite to the light source on the first resin lens 22A arranged distant from the light source unit 30. For information, a phrase that the change of the shape is small means that a change of a tangent angle is small. Specifically, as is illustrated in FIG. 8, the lens face S3 (lens face S3 on which diffraction grating 24c is provided) in or on the side opposite to the light source on the second resin lens 24A which is arranged in or on the side closer to the light source unit 30 is formed to be a face having a planar shape perpendicular to an optical axis AX (plane or face which has little change of shape and small tangent angle and is close to plane). One advantage of forming the lens face S3 on which the diffraction grating 24c is provided to be a face having a planar shape is as follows.

Specifically, the diffraction grating 24c is formed by a process of preparing a die by cutting and working a base material such as a hard metal with the use of a working tool such as a diamond byte, injecting a transparent resin such as an acrylic resin (e.g., PMMA) into this die, and cooling and solidifying the injected resin.

In a resin lens which has used the diffraction grating (for instance, second resin lens 24A), the grating shape of the diffraction grating 24c is determined so that the light quantity of a designed order of diffraction (usually, primary diffracted light) increases and the light quantity of the diffracted light of other orders of diffraction decreases, which becomes stray light.

However, in the resin lens which has used the diffraction grating (for instance, second resin lens 24A), efficiency loss (diffraction loss) occurs and the diffracted light of other orders of diffraction other than the designed order of the diffraction is generated, by the deterioration of working accuracy, which originates in tooling R that is formed when a diffraction shape (blaze) is worked and a working loss due to a damage of a working tool such as a diamond byte, and by the deterioration of transfer accuracy in molding, and the quantity of stray light (flare and glare) increases. This problem is reduced by a process of forming the shape of the lens face S3 on which the diffraction grating 24c is provided, so as to be a planar shape perpendicular to the optical axis AX (plane or face which has little change of shape and small tangent angle and is close to plane).

This advantage is described below with reference to FIG. 7A and FIG. 7B. When FIG. 7A is compared with FIG. 7B, it is understood that when the shape of the diffraction grating 24c is formed to be a plane (face having small tangent angle 0 deg) (see FIG. 7A), the working loss becomes less, and a diffraction loss and the stray light which originate in the working loss can be more suppressed.

The diffraction grating 24c is provided in an annular region closer to the outer periphery, through which light that causes color bleeding passes, out of the lens face S3 in or on the side opposite to the light source on the second resin lens 24A, and is not provided in a region on an inner side of the annular region. An advantage of thus restricting a range in which the diffraction grating 24c is provided is as follows. Specifically, the range in which the diffraction grating 24c is provided is restricted to the annular region that is closer to the outer periphery out of the lens face S3 in or on the side opposite to the light source on the second resin lens 24A, and thereby the range of the occurrence of the diffraction loss is minimized, the efficiency is enhanced, the stray light can be reduced, and also the deterioration of the working accuracy of the diffraction grating due to the damage of the working tool such as the diamond byte can be mitigated.

The lens face S4 in or on the light source side on the second resin lens 24A is formed to be a face having a planar shape perpendicular to the optical axis AX (plane or face which has little change of shape and small tangent angle and is close to plane).

The projection lens 20A having the above described structure projects a light source image which is formed on the back side focal plane thereof by the light source unit 30, onto a virtual vertical screen that directly faces the front face of a vehicle (which is arranged approximately 25 m frontward of vehicle, for instance), in a form of an inverted image. Thereby, a light distribution pattern is formed on the virtual vertical screen, which includes a plurality of individual light distribution patterns that are arranged in one row in a horizontal direction (or in matrix form) and in which turning-on and turning-off of the light are controlled individually (see rectangular light distribution patterns $A_1$ to $A_9$ in FIG. 3A, and rectangular light distribution patterns R1 to R4 (or L1 to L4) in FIG. 3B, for instance).

This light distribution pattern shall show the improved color bleeding in the vicinity of boundary lines between light and shade (see boundary lines E1 to E4 between light and shade in FIGS. 3A and 3B, for instance), which constitute respective sides of the individual rectangular light distribution patterns, while keeping image-forming properties of each of the individual rectangular light distribution patterns, by the action of the projection lens 20A having the above described structure.

For information, it is acceptable to form an anti-reflection coating such as an AR coating, on each of the lens faces S1 to S6, in order to enhance the transmissivity. In addition, it is also acceptable to subject at least one lens face (such as, lens face S3 in or on surface side of second resin lens 24A, and the like) out of the lens faces S1 to S6 to embossing or treatment such as microtexture (fine unevenness), in order to obscure the light distribution pattern. In addition, a part of at least one lens face out of the lens faces S1 to S6 may be a free-form surface in order to change the light distribution pattern intentionally. In addition, the light distribution pattern to be projected may be a low beam, a high beam or an intermediate beam pattern therebetween.

Incidentally, in the present embodiment, the example has been described in which a projector type headlight of the presently disclosed subject matter is a so-called direct projection type (referred to as direct type as well) of a lamp unit 10A for vehicles, but the presently disclosed subject matter is not limited to the example. For instance, the projector type headlight of the presently disclosed subject matter may be a general projector type of lamp unit for vehicles, which has a reflector and a shade.

As has been described above, in the lamp unit 10A for vehicles of the present embodiment, the projection lens 20A includes three resin lenses 22A, 24A and 26A. Thereby, the structure has the following advantages.

Firstly, the structure can reduce a difference in wall thickness (difference in wall thickness between central part of lens and peripheral part of lens in optical axis AX direction) of individual resin lenses 22A, 24A and 26A, as compared to the case where the projection lens 20A is structured from one resin lens. Because of this, the structure can suppress the aggravation of molding accuracy, which originates in sink and deformation of individual resin lenses 22A, 24A and 26A at the time of molding, as compared to the case where the projection lens 20A is structured from one resin lens. As a result, the grating shape of the diffraction grating 24c can be kept and color bleeding in the vicinity of the boundary line between light and shade (see boundary lines E1 to E4 between light and shade in FIGS. 3A and 3B, for instance) in the predetermined light distribution pattern can be improved, even when the diameter of the projection lens 20A (three resin lenses 22A, 24A and 26A) has been enlarged (to φ 60 mm or more, for instance), as compared to the case where the projection lens 20A is structured from one resin lens. Secondly, the structure can decrease the wall thickness of individual resin lenses 22A, 24A and 26A, and accordingly can shorten a molding period of time, as compared to the case where the projection lens 20A is structured from one resin lens. Thirdly, the structure can enlarge the diameter of the projection lens 20A, and accordingly can enhance luminous intensity and light quantity, as compared to the case where the projection lens 20A is structured from one resin lens. Fourthly, the second resin lens 24A can be further thinner, and accordingly a molding cycle of the second resin lens 24A can be shortened. Furthermore, individual resin lenses 22A, 24A and 26A are formed from a transparent resin, and accordingly there is also such an advantage as to be capable of achieving weight saving of the lamp unit 10A for vehicles, as compared to the case where the individual resin lenses 22A, 24A and 26A are formed from a glass material.

In addition, in the lamp unit 10A for vehicles of the present embodiment, the diffraction grating 24c is provided on the lens face S3 in the side opposite to the light source on the second resin lens 24A arranged between the first resin lens 22A and the third resin lens 26A out of the three resin lenses 22A, 24A and 26A. One advantage of providing the diffraction grating 24c on the lens face S3 in or on the side opposite to the light source on the second resin lens 24A is as follows. Specifically, when the diffraction grating 24c is provided on the lens face S3 in or on the side opposite to the light source of the second resin lens 24A, the light which is incident on an edge portion 24d (step portion) of the diffraction grating 24c decreases as compared to the case where the diffraction grating 24c is provided on the lens face S4 in or on the light source side, and accordingly a direction of the beam of the light which is incident on the diffraction grating 24c can be controlled toward a direction in which diffraction loss is little (stray light is little), and the occurrence of the diffraction loss (stray light) can be reduced.

In addition, in the lamp unit 10A for vehicles of the present embodiment, the diffraction grating 24c is provided on the second resin lens 24A which has the thinnest wall thickness out of the three resin lenses 22A, 24A and 26A. Thereby, the structure has the following advantages. Specifically, the second resin lens 24A having the thinnest wall thickness can suppress the aggravation of molding accuracy, which originates in sink and deformation at the time of molding, as compared to the first resin lens 22A and the third resin lens 26A having a thicker wall thickness. Accordingly, by such a structure that the diffraction grating 24c is provided on the second resin lens 24A having the thinnest wall thickness, the grating shape of the diffraction grating 24c can be kept and color bleeding in the vicinity of the boundary line between light and shade (see boundary lines E1 to E4 between light and shade in FIGS. 3A and 3B, for instance) in the predetermined light distribution pattern can be improved, even when the diameter of the projection lens 20A (three resin lenses 22A, 24A and 26A) has been enlarged (to φ 60 mm or more, for instance).

In addition, in the lamp unit 10A for vehicles of the present embodiment, the diffraction grating 24c is provided on the lens face S3 having a planar shape perpendicular to the optical axis AX (plane or face which has little change of shape and small tangent angle and is close to plane). Thereby, the lamp unit can reduce the working loss due to the damage of the working tool such as the diamond byte, as compared to the case where the diffraction grating 24c is provided on a lens face other than the lens face having the planar shape. As a result, it becomes possible to reduce a diffraction loss and the stray light which originate in the working loss.

In addition, the lamp unit 10A for vehicles of the present embodiment can show the improved color bleeding in the vicinity of each boundary line between light and shade of a plurality of individual light distribution patterns (see boundary lines E1 to E4 between light and shade in FIGS. 3A and 3B, for instance), while keeping image-forming properties of each of a plurality of the individual light distribution patterns (see rectangular light distribution patterns $A_1$ to $A_9$ in FIG. 3A, and rectangular light distribution patterns R1 to R4 (or L1 to L4) in FIG. 3B, for instance) which are arranged in one row in a horizontal direction or in a matrix form and in which turning-on and turning-off of the light are controlled individually.

In addition, in the lamp unit 10A for vehicles of the present embodiment, the range in which the diffraction grating 24c is provided is restricted to the annular region that is closer to the outer periphery, out of the lens face S3 in or on the side opposite to the light source on the second resin lens 24A, and thereby the range of the occurrence of the diffraction loss is minimized, the efficiency is enhanced, the stray light can be reduced, and also the deterioration of the working accuracy of the diffraction grating due to the damage of the working tool such as the diamond byte can be mitigated.

The embodiments are only examples in various points. The presently disclosed subject matter should not be restrictively interpreted by these descriptions. The presently disclosed subject matter can be carried out in other various forms as long as the aspect does not depart from the concept or the principal feature of the presently disclosed subject matter.

What is claimed is:

1. A projector type headlight comprising:
   a projection lens which is arranged on an optical axis, the optical axis extending in a longitudinal direction of a vehicle, the projection lens having a focal plane; and
   a light source unit which is arranged on a more rear side than a back side of the focal plane of the projection lens,
   wherein the projection lens includes two resin lenses which are arranged on the optical axis,
   the light source unit includes a light source and is configured so as to form a light source image that is emitted forward through the two resin lenses and forms a light distribution pattern including a boundary line between light and shade, substantially on the back side focal plane of the projection lens,
   a first resin lens of the two resin lenses is arranged closer to the light source and includes a diffraction grating on a lens face in a side opposite to the light source,
   the first resin lens of the two resin lenses which is arranged closer to the light source has a lens face having a positive power, which is arranged in a light source side, and
   the diffraction grating is configured to cancel chromatic aberration of light which is emitted from the light source unit and is emitted forward through the two resin lenses, and
   wherein the first resin lens out of the two resin lenses which is arranged closer to the light source has a wall thickness thinner than a wall thickness of a second resin lens arranged more distant from the light source.

2. The projector type headlight according to claim 1, wherein the lens face in the side opposite to the light source on the first resin lens out of the two resin lenses which is arranged closer to the light source is formed to be a face in which a change of the shape of the lens face is smaller than a change of the shape of the lens face in the side opposite to the light source on a second resin lens that is arranged distant from the light source, and the diffraction grating is provided on the lens face in the side opposite to the light source on the first resin lens that is arranged closer to the light source.

3. The projector type headlight according to claim 2, wherein the lens face in the side opposite to the light source on the first resin lens which is arranged closer to the light source is perpendicular to the optical axis and has a planar shape.

4. The projector type headlight according to claim 1, wherein the light distribution pattern comprises a plurality of individual light distribution patterns which are arranged in one row in a horizontal direction or in a matrix form, and in which turning-on and turning-off of the light are controlled individually.

5. The projector type headlight according to claim 4, wherein an individual light distribution pattern is a rectangular light distribution pattern of which each side is a boundary line between light and shade.

6. The projector type headlight according to claim 1, wherein the diffraction grating is provided in an annular region adjacent an outer periphery, through which light that causes color bleeding passes, on the lens face in the side opposite to the light source on the first resin lens out of the two resin lenses which is arranged closer to the light source, and is not provided in a region on an inner side of the annular region.

7. The projector type headlight according to claim 1, wherein the projection lens consists of two resin lenses.

8. A projector type headlight comprising:

a projection lens which is arranged on an optical axis, the optical axis extending in a longitudinal direction of a vehicle, and the projection lens including a focal plane; and a light source unit which is arranged at a more rear side than a back side of the focal plane of the projection lens, wherein the projection lens includes three resin lenses which are arranged on the optical axis, the light source unit includes a light source and is configured so as to form a light source image that is emitted forward through the three resin lenses and forms a light distribution pattern including a boundary line between light and shade, substantially on the back side of the focal plane of the projection lens, a first resin lens which is arranged most distant from the light source and a third resin lens which is arranged closest to the light source out of the three resin lenses each has a positive power, a second resin lens out of the three resin lenses is arranged between the first resin lens and the third resin lens and includes a diffraction grating provided on a lens face in a side opposite to the light source, and the diffraction grating is designed so as to cancel chromatic aberration of light which is emitted from the light source unit and is emitted forward through the three resin lenses, wherein the second resin lens has a wall thickness thinner than a wall thickness of each of the first resin lens and the third resin lens, respectively.

9. The projector type headlight according to claim 8, wherein the lens face in the side opposite to the light source on the second resin lens is perpendicular to the optical axis and has a planar shape, and the diffraction grating is provided on the lens face having the planar shape.

10. The projector type headlight according to claim 8, wherein the light distribution pattern comprises a plurality of individual light distribution patterns which are arranged in one row in a horizontal direction or in a matrix form, and in which turning-on and turning-off of the light are controlled individually.

11. The projector type headlight according to claim 10, wherein an individual light distribution pattern is a rectangular light distribution pattern of which each side is a boundary line between light and shade.

12. The projector type headlight according to claim 8, wherein the diffraction grating is provided in an annular region adjacent to an outer periphery, through which light that causes color bleeding passes, on the lens face in the side opposite to the light source on the second resin lens, and is not provided in a region on an inner side of the annular region.

13. The projector type headlight according to claim 8, wherein the projection lens consists of three resin lenses.

* * * * *